G. KRETZSCHMAR.
GEOGRAPHICAL CLOCK.
APPLICATION FILED JUNE 15, 1911.
1,015,195.
Patented Jan. 16, 1912.
3 SHEETS—SHEET 1.
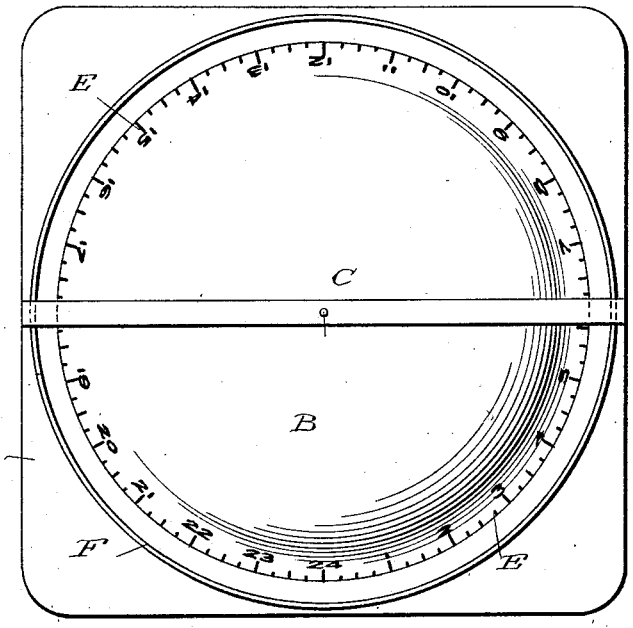
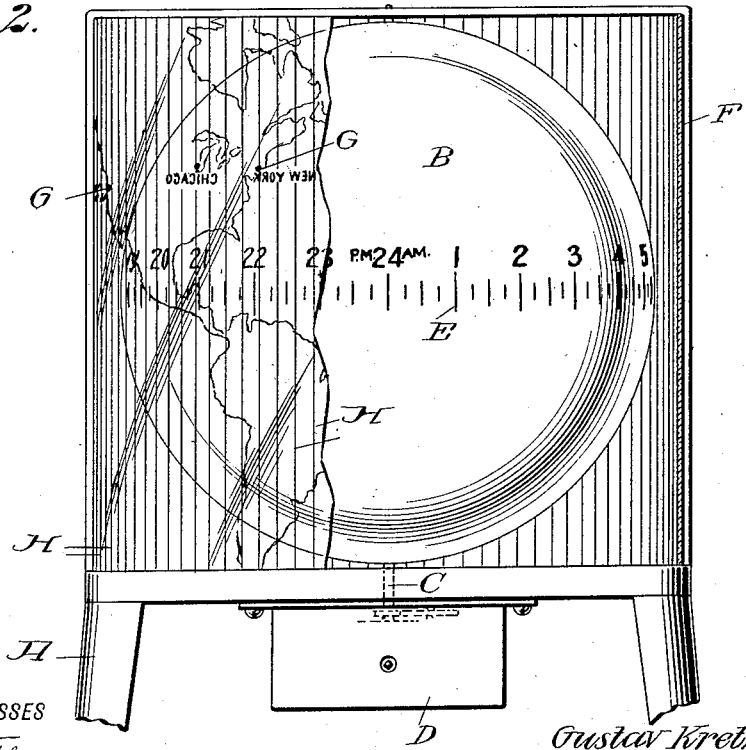
WITNESSES
INVENTOR
Gustav Kretzschmar
BY
ATTORNEYS

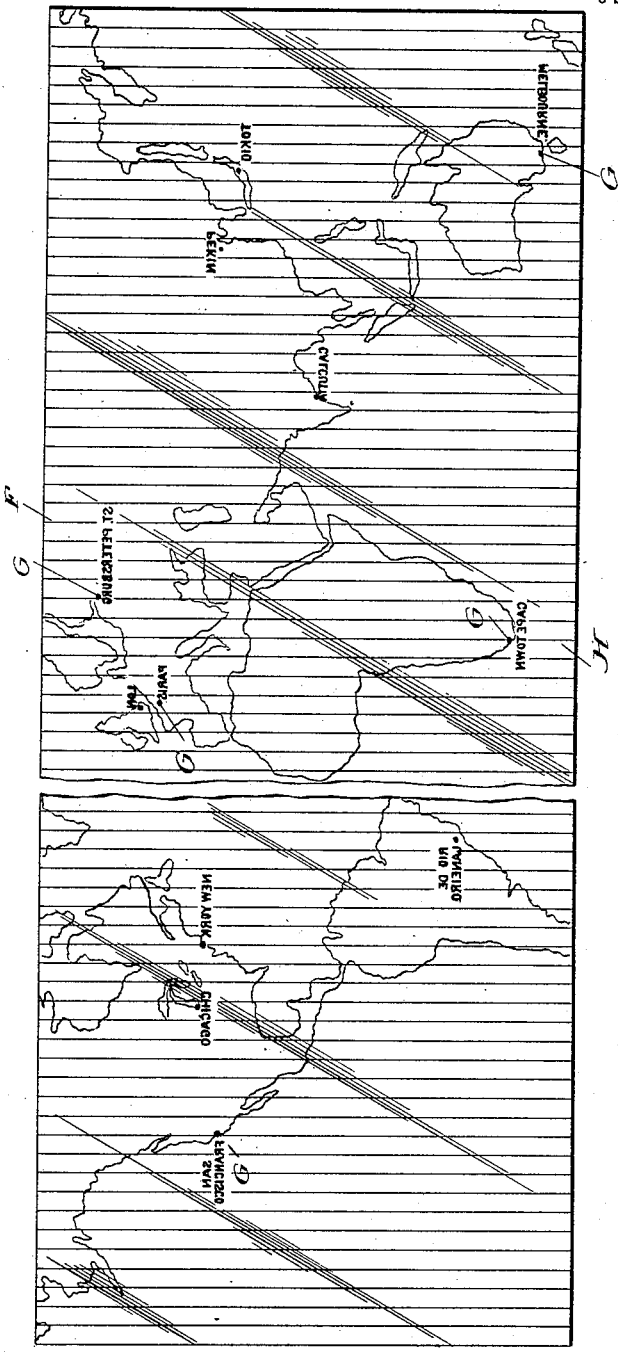

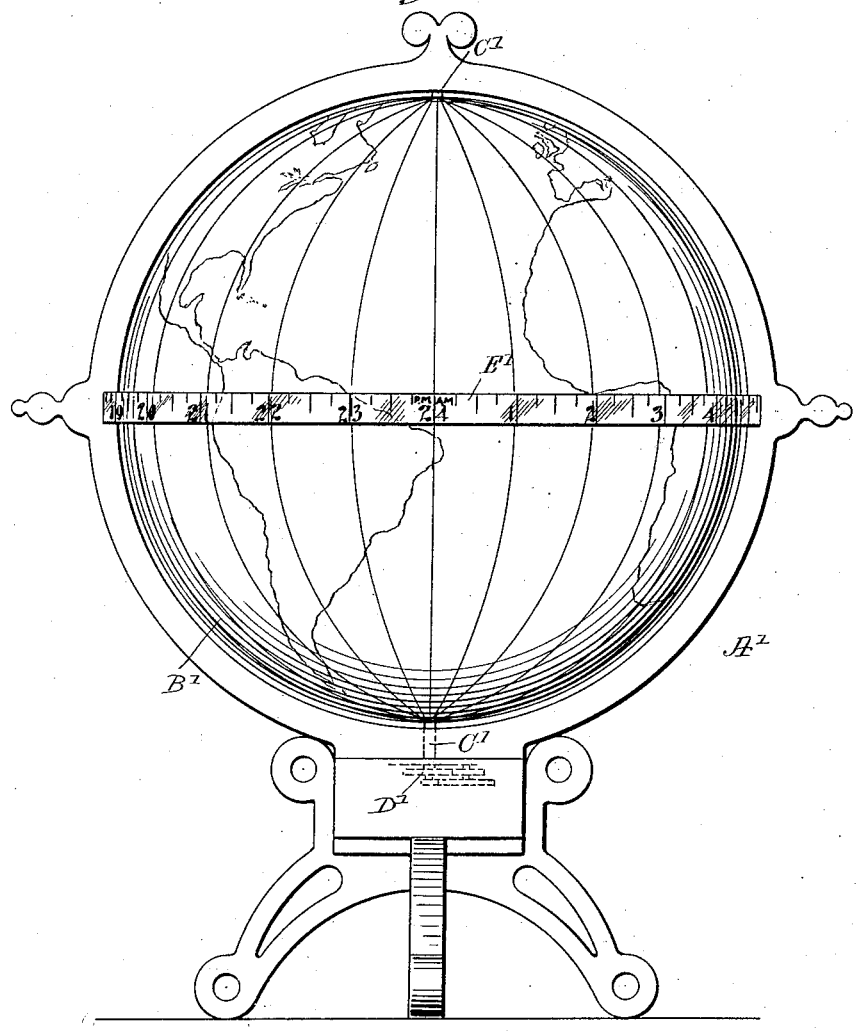

UNITED STATES PATENT OFFICE.

GUSTAV KRETZSCHMAR, OF PAAUILO, TERRITORY OF HAWAII.

GEOGRAPHICAL CLOCK.

1,015,195.  Specification of Letters Patent.  Patented Jan. 16, 1912.

Application filed June 15, 1911. Serial No. 633,279.

*To all whom it may concern:*

Be it known that I, GUSTAV KRETZSCHMAR, a citizen of the United States, and a resident of Paauilo, Hamakua, Territory of Hawaii, have invented a new and Improved Geographical Clock, of which the following is a full, clear, and exact description.

The invention relates to horology, and its object is to provide a new and improved geographical clock, arranged to permit convenient reading of the correct time for any geographical point on the earth. For the purpose mentioned, use is made of a clock-driven sphere, having a reflecting surface, and provided along the equator with a graduation indicating the twenty-four hours and sub-divisions of a day, and a transparent cylinder surrounding the said sphere, and having a map of the earth appearing thereon together with the meridians.

A practical embodiment of the invention is represented in the accompanying drawings forming a part of this specification, in which similar characters of reference indicate corresponding parts in all the views.

Figure 1 is a plan view of the geographical clock; Fig. 2 is a side elevation of the same, part of the cylinder being in section; Fig. 3 is a developed view of the transparent cylinder; and Fig. 4 is a side elevation of a modified form of the geographical clock.

The geographical clock illustrated in Figs. 1 and 2 is mounted on a suitably constructed frame A, on which is mounted to rotate a sphere B, having its vertical shaft C connected with a clockwork D, so as to rotate the sphere B once in every twenty-four hours. Along the equator of the sphere B is arranged a graduation E indicating the twenty-four hours and sub-divisions of a day, as indicated in Figs. 1 and 2. A cylinder F, of glass or other transparent material, concentrically surrounds the sphere B and is mounted on the stand A, and on the said cylinder F is projected a map of the earth, indicating more particularly the principal cities G and the meridians H, the map being in projection, as will be readily understood by reference to Fig. 3.

The geographical clock is used as follows: The time of the day indicated by the graduation E is opposite the point on the meridian for any given place at which the geographical clock is located at the time, and the time for any other point on the earth can be readily found by following this point as projected onto the surface of the sphere B down to the graduation E, the point of intersection giving the correct time on the graduation E.

It is understood that to the observer each city G and its meridian H is seen on the reflecting surface of the sphere, and hence such meridian line can be followed readily to the hour graduation to read the correct time for the particular distant city whose time is to be determined.

The hour graduation is preferably made in white so as to strongly contrast with the silvered or reflecting surface of the sphere, and thus permit convenient reading of the time.

In the modified form shown in Figs. 4, the sphere B' is attached to a vertical shaft C' journaled on the stand A' and driven by a clockwork D', so as to rotate once in every twenty-four hours. A map of the earth is mounted on the sphere B', and in alinement with the equator is arranged a transparent hour scale E' fixed on the stand A'. The geographical clock shown in Fig. 4 is used in the same manner as above described in reference to Figs. 1 and 2, that is, the observer can readily trace a distant city or other place along the corresponding meridian until said meridian intersects with the hour scale the point of intersection indicating the time for the particular distant city or place.

In order to indicate day and night, use may be made of red light within the globe, and indicating means in the form of letters representing P. M. and A. M. may be placed on the hour scale to indicate the corresponding portion of the day.

Having thus described my invention, I claim as new and desire to secure by Letters Patent:—

1. A geographical clock, comprising a sphere having a reflecting surface, and provided with a graduation along the equator representing the hours of a day and sub-divisions, and a transparent cylinder surrounding the said sphere and provided with a projected map of the earth and with meridian lines, the said sphere and cylinder having revolving movement one relative to the other.

2. A geographical clock, comprising a sphere having a graduation along the equator representing the hours of a day and sub-divisions, a fixed transparent cylinder surrounding the said sphere and provided with a projected map of the earth and with meridian lines, and a clock mechanism for rotating the said sphere relatively to the said cylinder.

3. A geographical clock, comprising a clock-driven sphere having a reflecting surface and provided along the equator with a graduation representing the hours of a day and sub-divisions, means for indicating the portions of the day, and a transparent fixed cylinder concentrically surrounding the said sphere, and provided with a projected map showing the principal points of the earth and the meridians.

4. A geographical clock, comprising a supporting stand, a sphere mounted to rotate on the stand and having a reflecting surface, the said sphere being provided along the equator with a graduation representing the hours of a day and sub-divisions, a cylinder of transparent material mounted on the stand and surrounding the said sphere, the said cylinder being provided with a map of the earth and with meridian lines, and mechanism for rotating the said sphere.

In testimony whereof I have signed my name to this specification in the presence of two subscribing witnesses.

GUSTAV KRETZSCHMAR.

Witnesses:
F. W. WALKER,
J. W. LEONHART.

Copies of this patent may be obtained for five cents each, by addressing the "Commissioner of Patents, Washington, D. C."